(12) United States Patent
Kozloski et al.

(10) Patent No.: US 11,710,278 B2
(45) Date of Patent: Jul. 25, 2023

(54) PREDICTIVE VIRTUAL RECONSTRUCTION OF PHYSICAL ENVIRONMENTS

(71) Applicant: International Business Machines Corporation, Armonk, NY (US)

(72) Inventors: James R. Kozloski, New Fairfield, CT (US); Sarbajit K. Rakshit, Kolkata (IN); Michael S. Gordon, Yorktown Heights, NY (US); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 846 days.

(21) Appl. No.: 16/699,836

(22) Filed: Dec. 2, 2019

(65) Prior Publication Data

US 2021/0166483 A1 Jun. 3, 2021

(51) Int. Cl.
*G06T 19/00* (2011.01)
*G06N 5/04* (2023.01)
*G06T 19/20* (2011.01)
*G06N 20/00* (2019.01)
(Continued)

(52) U.S. Cl.
CPC ........... *G06T 19/006* (2013.01); *G06N 5/022* (2013.01); *G06N 5/04* (2013.01); *G06N 20/00* (2019.01); *G06T 15/506* (2013.01); *G06T 19/20* (2013.01)

(58) Field of Classification Search
None
See application file for complete search history.

(56) References Cited

U.S. PATENT DOCUMENTS

| 5,660,547 A * | 8/1997 | Copperman | G09B 9/05 434/62 |
| 6,741,168 B2 | 5/2004 | Webb et al. | |
| 6,850,843 B2 | 2/2005 | Smith et al. | |

(Continued)

OTHER PUBLICATIONS

Ning et al., "STAPLE: Spatio-Temporal Precursor Learning for Event Forecasting", Proceedings of the 2018 SIAM International Conference on Data Mining, May 2018, DOI: 10.1137/1.9781611975321.17, 9 pages.

(Continued)

*Primary Examiner* — Jeffrey J Chow
(74) *Attorney, Agent, or Firm* — Joseph P. Curcuru

(57) ABSTRACT

Embodiments of the present invention describe predictively reconstructing a physical event using augmented reality. Embodiments describe, identifying relative states of objects located in a physical event area by using video analysis to analyze collected video feeds from the physical event area before and after a physical event involving at least one of the objects, creating a knowledge corpus including the video analysis and the collected video feeds associated with the physical event and historical information, and capturing data, by a computing device, of the physical event area. Additionally, embodiments describe identifying possible precursor events based on the captured data and the knowledge corpus, and generating a virtual reconstruction of the physical event using the possible precursor events, displaying, by the computing device, the generated virtual reconstruction of the predicted physical event, wherein the displayed virtual reconstruction of the predicted physical event overlays an image of the physical event area.

20 Claims, 3 Drawing Sheets

(51) Int. Cl.
  *G06T 15/50* (2011.01)
  *G06N 5/022* (2023.01)

(56) References Cited

U.S. PATENT DOCUMENTS

| | | | |
|---|---|---|---|
| 8,751,528 | B2 | 6/2014 | Huang |
| 8,954,226 | B1 | 2/2015 | Binion |
| 9,280,852 | B2 | 3/2016 | Adhikari |
| 9,691,189 | B1 | 6/2017 | Creath |
| 10,106,156 | B1 | 10/2018 | Nave et al. |
| 11,308,741 | B1 * | 4/2022 | Cardona ............. G10L 15/26 |
| 11,449,946 | B1 * | 9/2022 | Gutsell ............. H04N 7/183 |
| 2010/0030540 | A1 | 2/2010 | Choi et al. |
| 2012/0076437 | A1 | 3/2012 | King |
| 2015/0029308 | A1 | 1/2015 | Han et al. |
| 2016/0277911 | A1 | 9/2016 | Kang et al. |
| 2017/0178013 | A1 | 6/2017 | Beloglazov |
| 2017/0286570 | A1 * | 10/2017 | Kim ............. G06F 11/3688 |
| 2018/0012411 | A1 | 1/2018 | Richey |
| 2018/0286099 | A1 | 10/2018 | Kozloski |
| 2019/0058849 | A1 | 2/2019 | Watanabe |
| 2019/0066387 | A1 * | 2/2019 | Grossmann ............. G06F 3/011 |
| 2019/0251449 | A1 | 8/2019 | Dai |
| 2019/0311544 | A1 * | 10/2019 | Kayo ............. G06T 19/006 |

OTHER PUBLICATIONS

WIPO, International Search Report & Written Opinion, Patent Cooperation Treaty Application No. IB2020/061256, dated Nov. 30, 2020.

Burgess et al., "Use of Virtual Environments for Simulation of Accident Investigation", White Paper, printed on Sep. 11, 2019, 12 pages, <https://commons.erau.edu/cgi/viewcontent.cgi?referer=https://www.google.com/&httpsredir=1 &article=1077&context=aircon>.

Cava, Marco Della, "Porsche is now using augmented reality glasses to repair cars", USA Today, May 29, 2018, 4 pages, <https://www.usatoday.com/story/tech/talkingtech/2018/05/29/porsche-now-using-augmented-reality-glasses-repair-cars/648673002/ >.

Pena et al., Augmented Reality for Accident Analysis, Copyright © 2018, 3 pages, <https://www.igi-global.com/chapter/augmented-reality-for-accident-analysis/204312>.

Saxen et al, "Chapter 23—Investigation of an Augmented Reality-Based Machine Operator Assistance-System", © Springer International Publishing AG 2017, 13 pages, <http://publica.fraunhofer.de/dokumente/N-502379.html >.

* cited by examiner

PREDICTIVE VIRTUAL RECONSTRUCTION OF PHYSICAL ENVIRONMENTS

BACKGROUND OF THE INVENTION

The present invention relates generally to the field of augmented reality, and more particularly to predictive virtual reconstruction of physical environments.

Augmented reality (AR) is an interactive experience of a real-world environment where the objects that reside in the real world are enhanced by computer-generated perceptual information, sometimes across multiple sensory modalities, including visual, auditory, haptic, somatosensory, and olfactory. AR can be defined as a system that fulfills three basic features: a combination of real and virtual worlds, real-time interaction, and accurate 3D registration of virtual and real objects. The overlaid sensory information can add to the natural environment, or mask of the natural environment. The AR experience can be seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

Augmented reality is used to enhance natural environments or situations and offer perceptually enriched experiences. With the help of advanced AR technologies (e.g. adding computer vision, incorporating AR cameras into smartphone applications and object recognition) the information about the surrounding real world of the user becomes interactive. Information about the environment and its objects is overlaid on the real world. Immersive perceptual information is sometimes combined with supplemental information like scores over a live video feed of a sporting event. This combines the benefits of both augmented reality technology and heads up display technology (HUD).

SUMMARY

Embodiments of the present invention disclose a method, a computer program product, and a system for reconstructing a physical event for predictively reconstructing a physical event using augmented reality, the computer-implemented method comprising: identifying relative states of objects located in a physical event area by using video analysis to analyze collected video feeds from the physical event area before and after a physical event involving at least one of the objects; creating a knowledge corpus including the video analysis and the collected video feeds associated with the physical event and historical information from previous physical events to correlate how relative positions of objects in the physical event area changed due to the physical event, types of physical events associated with post-events, and duration of the physical event that resulted in the post-events; capturing data, by a computing device, of the physical event area; identifying possible precursor events based on the captured data and the knowledge corpus; generating a virtual reconstruction of the physical event using the possible precursor events, wherein the physical reconstruction of the physical event is a predicted physical event most likely to have occurred during the physical event; and displaying, by the computing device, the generated virtual reconstruction of the predicted physical event, wherein the displayed virtual reconstruction of the predicted physical event overlays an image of the physical event area.

DETAILED DESCRIPTION

Figure 1:
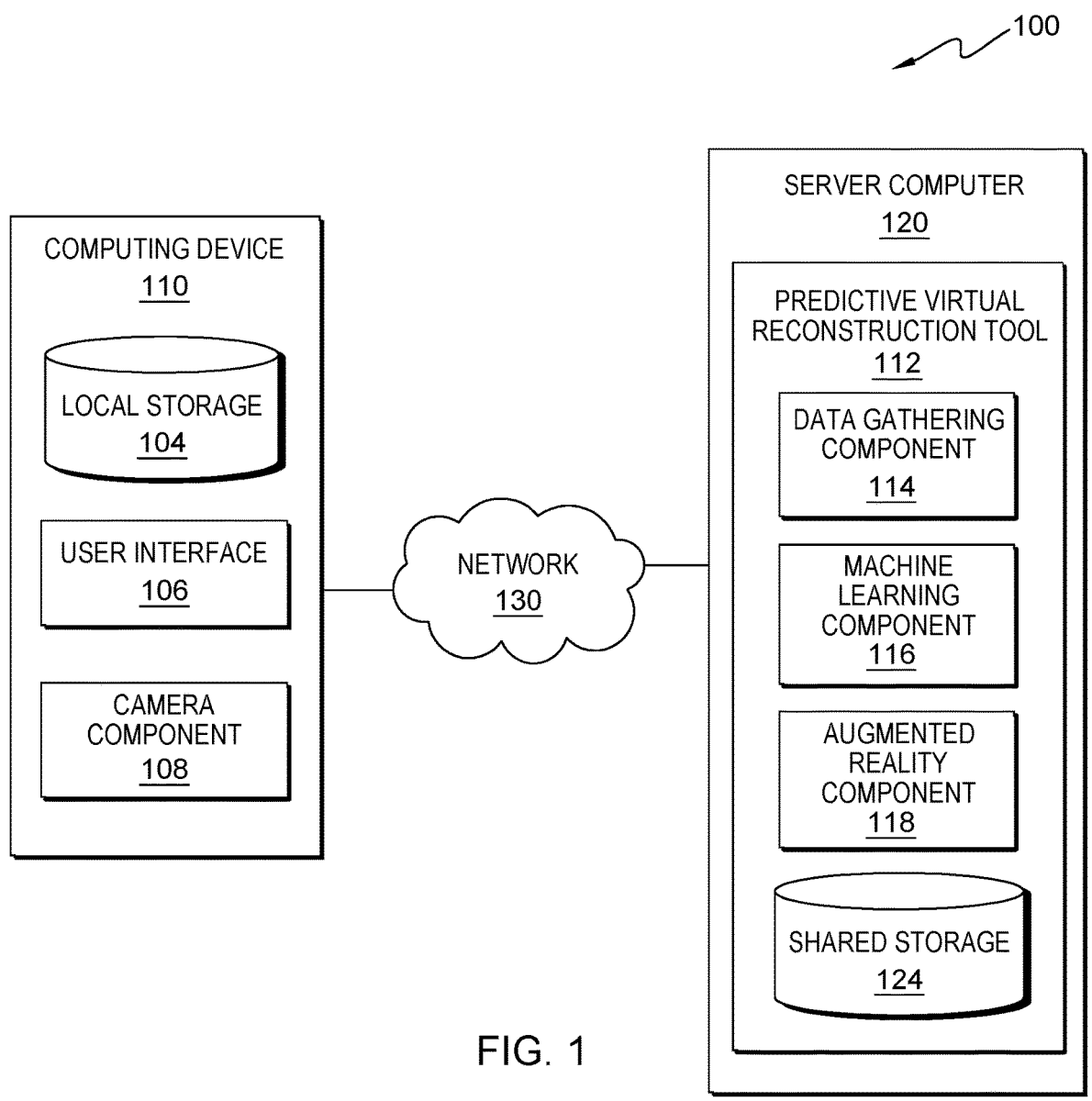
FIG. 1 is a functional block diagram illustrating a distributed data processing environment, in accordance with an embodiment of the present invention.

During an examination of a physical environment the user assesses the surrounding physical event, collects samples, like broken objects, relative position of the objects, different marks on the ground, damage to the surrounding area, and/or any other information related to a physical event that is known in the art. Accordingly, a user can analyze the physical event and area surrounding the physical event (i.e., physical event area) to determine the type of incident that might have taken place (e.g., car accident, natural disaster, or any circumstances involving a physical event known in the art). A physical event is an event involving one or more physical objects that interact with another one or more physical objects (e.g., car accident, natural disaster, or any circumstances involving a physical object known in the art). Currently in the art, approaches to determine what events occurred prior to the physical event (i.e., precursor events) and events that occurred during the physical event include a user trying to guess the many different incidents that might have taken place in and around the physical event area. Many times, it is very difficult for a user to correctly guess or determine the events that occurred leading up to the physical event and the events that happened during and after the physical event, collectively referred to as precursor events. Furthermore, currently in the art, in many cases predicting and determining the precursor events and the events after the physical event (i.e., post-events) is not be possible, which can lead to delays and decision errors.

Embodiments of the present invention can solve the problems stated above by providing an artificial intelligence (AI) based augmented reality system that can analyze the surrounding area and can predict, using one or more machine learning models trained on historical (physical) events, what happened in the physical event area. For example, the one or more machine learning models that may be used to model the sequences of events and predict precursor events including Markov models, reinforcement learning (RL), recurrent neural network, sequence mining model, and/or time series model. Additionally, embodiments of the present invention can improve the current art by display the predicted precursor events, the events that occurred during the physical event and the post-events as predicted by the one or more machine learning models through augmented reality (AR) glasses or an AR application on a smartphone. Embodiments of the present invention can improve the current art by presenting a list of potential scenarios of precursor events by generating sequences using recurrent neural networks (RNN) and the events that occurred during the physical event to a user, wherein the list of potential scenarios of the physical events is ranked from most likely to have occurred to least likely to have occurred.

Embodiments of the present invention can improve AR technology by utilizing a data gathering module to gather historical physical event information that includes: video feeds (i.e., captured video) of different types of physical events, previously recorded or reported physical events; internet of things (IoT) feeds related to any physical events; and computer generated simulation results of different types of physical events. Accordingly, embodiments of the present invention can, improve the art of AR technology by utilizing machine learning models to create a knowledge corpus by collecting and storing collected historical information associated with a current physical event and previous physical events. Embodiments of the present invention create the knowledge corpus by correlating various parameters of precursor events and post-events from the previously collected data, so that embodiments of the present invention may efficiently predict the physical event and virtually reconstruct the area and physical event (e.g., demonstrate how the different objects were broken or damaged, illustrate how the relative position of the objects might have changed, list the types of events that could have happened to create the physical event and the post-events as learned by the one or mode machine learning models; and the determine the degree of criticality or severity of the physical event). Classification of the degree of criticality or severity of the physical event may be done using a bidirectional Long Short-term Memory (LSTM) model.

When a user looks at the surrounding physical event area through AR glasses, embodiments of the present invention can assess the surrounding physical event area. Embodiments of the present invention can virtually display, via augmented reality, a simulation of demonstrating how the physical event might have occurred, including the different types of potential precursor events, how the position of an object was moved or how the object was damaged. Embodiments of the present invention can mimic the lighting, weather conditions, and/or environment conditions of the physical event area at the time the physical event occurred, via AI enabled augmented reality. For example, a user can observe whether a driver was temporarily blinded by the setting sun, or by the glare of the sun off a side view mirror.

Embodiments of the present invention can predict the types of intensity, direction of the intensity, and duration of intensity of a physical event and accordingly display the predicted events of the physical event to the user through AR glasses or a computing device with AR capability using the one or more machine learning models (e.g., RNN). Embodiments of the present invention can reconstruct the physical event and display the physical event reconstruction through an augmented reality component. Embodiments of the present invention can display animated augmented reality graphics to explain how the physical event might have created the physical event area to help a user to reconstruct the precursor events and understand details about the physical event (e.g., earthquakes, hurricanes, traffic patterns, etc.). Embodiments of the present invention can overlay AR simulated or learned reconstructed physical event scenarios at similar locations to the current physical event area to identify any similarities and/or differences in the physical event and/or post events. Embodiments of the present invention can predict the original position of various objects before the physical event occurred and display how the relative position of the objects were changed due to the physical event. For example, virtually displaying an objects trajectory, via AR simulation.

It should be noted herein that in the described embodiments, participating parties (i.e., users) have consented to having their images taken, uploaded, and saved and being recorded and monitored. Additionally, participating parties are aware of the potential that such recording and monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 3).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110 and server computer 120, and any other computing devices and/or storage devices (not shown in FIG. 1) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In various embodiments, camera component 108 is executed on computing device 110. In some embodiments, camera component 108 can be located and/or executed anywhere within distributed data processing environment 100. Camera component 108 can be one or more cameras that are known in the art. In various embodiments, camera component 108 can provide video feeds (video feed) of what the user is viewing to computing device 110 or more specifically virtual reconstruction tool 112. A video feed may be transmitted in real-time as a live video feed or recorded and transmitted as a recorded video feed. The term "video feed" as used herein may refer to one or both types of video feeds. In various embodiments, virtual reconstruction tool 112 can enable computing device 110 to store the captured video feed and/or photographs to shared storage 124 and/or local storage 104. In various embodiments, camera component 108 is capable of recording, transmitting, and storing video feeds and capable of taking, transmitting, and storing photographs.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106 and local storage 104. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 3.

User interface (interface) 106 provides an interface to predictive virtual reconstruction tool (virtual reconstruction tool) 112. Computing device 110, via user interface 106, can enable a user and/or a client to interact with virtual reconstruction tool 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Each of shared storage 124 and local storage 104 can be a data/knowledge repository and/or a database that can be written and/or read by one or a combination of virtual reconstruction tool 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house physical event data, and/or data shared throughout distributed data processing environment 100.

In various embodiments, virtual reconstruction tool 112 is executed on server computer 120. In other embodiments, virtual reconstruction tool 112 can be executed on computing device 110. In some embodiments, virtual reconstruction tool 112 can be located and/or executed anywhere within distributed data processing environment 100. In various embodiments, virtual reconstruction tool 112 can be connected to and communicates with computing device 110 and/or server computer 120. In the depicted embodiments, virtual reconstruction tool 112 comprises data gathering component 114, machine learning component 116, and augmented reality component 118. In the depicted embodiment, data gathering component 114, machine learning component 116, and augmented reality component 118 each execute on virtual reconstruction tool 112. In some embodiments of the present invention, data gathering component 114, machine learning component 116, and augmented reality component 118 can be located and/or executed anywhere within distributed data processing environment 100 as long as data gathering component 114, machine learning component 116, and augmented reality component 118 can communicate with virtual reconstruction tool 112, computing device 110, and/or server computer 120.

In various embodiments of the present invention, virtual reconstruction tool 112, via data gathering component 114, can collect historical information from various sources of information such as: previously recorded video feed of different types of physical events, IoT feeds related to any physical event, previously generated computer graphics simulation results of different types of physical events, physical event reports, live video feed of the current physical event area, and/or any other data from previous physical events that is known in the art. In various embodiments of the present invention, virtual reconstruction tool 112, via machine learning component 116, consisting of one or more machine leaning models, can create a knowledge corpus using the collected historical information (i.e., previously collected data). In various embodiments of the present invention, virtual reconstruction tool 112, via machine learning component 116, can create a knowledge corpus by correlating various parameters of precursor events and post-events from the collected historical information so virtual reconstruction tool 112 can predict and determine the precursor events and post-events of the current physical event. In various embodiments of the present invention, virtual reconstruction tool 112 can use the correlated parameters identified from the knowledge corpus to reconstruct the physical event and physical event area (e.g., illustrate how different objects were broken or damaged, illustrate the relative position change of objects can be changed, identify the type of physical event that create the post-physical events, the physical event, and the degree of criticality or severity of the physical event).

In some embodiments of the present invention, when a user uses AR glasses and physically surveys the surrounding physical event area, virtual reconstruction tool 112 can simultaneously collect videos and photos to assess the surrounding physical event area through camera component 108. In various embodiments of the present invention, virtual reconstruction tool 112 can display different scenarios to a user illustrating how the physical event might have occurred, that include the type of physical event and demonstrates how the positions of the objects have moved or have been damaged. In various embodiments of the present invention, virtual reconstruction tool 112 can alter the lighting of the generated physical event reconstruction simulation so that the user might "observe" whether a driver was temporarily blinded by the setting sun, or the glare of the sun off a side view mirror.

In various embodiments of the present invention, virtual reconstruction tool 112 can predict the type of physical event, direction of the physical event, the intensity of the physical event, duration of the physical event and accordingly, generate reenactments of the predicted events and display the generated reenactments through computing device 110, via augmented reality component 118. In various embodiments of the present invention, virtual reconstruction tool 112, via augmented reality component 118, can generate and display animated graphics on computing device 110, wherein the animated graphics are augmented reality (virtual) reconstruction simulations that can illustrate and depict how the physical event might have occurred and help explain how the physical event area was created. In various embodiments of the present invention, virtual reconstruction tool 112, via data gathering component 114, can retrieve and analyze previously reconstructed physical event scenarios at similar locations and superimpose the previously reconstructed physical event scenarios over the current physical event and physical event area to look for similarities and/or differences.

In various embodiments of the present invention, virtual reconstruction tool 112 can predict the original position of various items/objects before the physical event occurred and can display the relative position of the objects that have changed due to the physical event. In various embodiments of the present invention, virtual reconstruction tool 112, via augmented reality component 118, can generate and display animated movement or path trajectories of objects affected by the physical event. In one particular embodiment of the present invention, virtual reconstruction tool 112 can collect physical event mechanisms, sequences, causes and effects of the physical event from a written text report. In this particular embodiment, virtual reconstruction tool 112 can analyze and interpret the documented written text report. In this particular embodiment, virtual reconstruction tool 112 can use the collected written text report and previously collected data to construct an augmented reality representation of the proposed sequence of events (i.e., virtual reconstruction of the physical event). When a simulated position, sequence, or outcome of events and objects is inconsistent with the final state recorded (e.g., an item falls on top of another item, despite their being in a different configuration in the real-world physical event), then the visualization simulation halts, highlights the inconsistency, and requests that the user alter or add more information to the report.

In various embodiments of the present invention, virtual reconstruction tool 112 can enable and support collaborative explanation drafting and virtual reality simulations. Virtual reconstruction tool 112 can enable different users to edit the explanation in parallel with virtual reconstruction simulations of the physical event, by branching from the master explanation, running simulations in this branch, and then committing the received modifications to the master, thus making it available to other collaborative users to view the newest version of the explanation. In various embodiments of the present invention, virtual reconstruction tool 112 can pull requests and conduct an up vote before committing to the master, which enables crowdsourced explanations.

In various embodiments of the present invention, virtual reconstruction tool 112 can compare a current virtual reconstruction simulation of the physical event to various regulations and constraints derived from a database comprising: i) building codes, ii) traffic laws, iii) safety certifications, iv) engineering specifications, and/or v) product warranties. In various embodiments of the present invention, virtual reconstruction tool 112 can highlight aspects (e.g., objects, sequences, cause effect relationships) in a virtual reality or augmented reality simulation and can annotate the aspects (e.g., by color or symbol) to indicate when and where a departure from constraints, codes, certifications, specifications, warranties, and/or any other various regulations known in the art may have occurred in the physical event area. In another embodiment of the present invention, using the objects, sequence of events, cause effect relationships and other data sources (e.g., video feed data from local and remote sensing or crowdsourced data) virtual reconstruction tool 112 can reconstruct and simulate a prediction of how the physical event occurred and can display a predicted scenario of the physical event on computing device 110 (i.e., a virtual reality system or AR system) as a replay of the physical event. Wherein the replay can indicate "point of hot spots" using annotation to mark potential risky patterns or events that might cause the events in the physical event while cross-referencing relevant regulations. The reconstructed replay can be shared from one computing device to another and can be converted to three-dimensional (3D) models as needed.

In some embodiments of the present invention, the current physical event, reply and associated collaboratively explained/edited draft can be managed and tracked using smart contracts and blockchain. In various embodiments of the present invention, a user can wear a pair of AR enabled glasses or a virtual reality headset and relive the precursor events, the physical event, and the post-events. For example, a user drives the car, as if it was a car in the physical event, and the AR enabled glasses display a simulation of a car cutting in front of him in a fashion that might have caused the car accident. Alternatively, virtual reconstruction tool 112 can display the virtual reconstruction simulation on the windshield of a vehicle in real-time as a HUD for a user. In various embodiments of the present invention, virtual reconstruction tool 112, via machine learning component 114, can gather historical physical event reports, historical physical event simulations, physical event related video feeds and IoT feeds to create a knowledge corpus. In various embodiments of the present invention, virtual reconstruction tool 112, via augmented reality component 118, can enabled a user to view a virtual recreation of a predicted explanation of the events in the current physical event through computing device 110 (e.g., a pair of augmented reality glass or smart phone).

In various embodiments of the present invention, virtual reconstruction tool 112, via data gathering component 114, can gather previously recorded and saved video feeds of various physical events including any dashboard camera, traffic camera, IoT feed, and/or any other camera or camera feed known in the art. In various embodiments of the present invention, virtual reconstruction tool 112 can retrieve images and/or video from an IoT feed from a fixed camera and/or IoT device in the physical event area, wherein the IoT feed can comprise, but is not limited to, the type of force, temperature, direction of impact (if necessary), time of day, and weather conditions associated with the physical event. In various embodiments of the present invention, virtual reconstruction tool 112, via data gathering component 114, can collect or retrieve reports about the physical event from a user or from a knowledge repository (e.g., local storage 104 and/or shared storage 124), while concurrently collecting the video-based simulation results of the different types of predicted physical events, wherein the predicted physical events are ranked from most likely to occur to least likely to occur. In various embodiments of the present invention, virtual reconstruction tool 112 can cluster the collected data based on precursor events, the physical event and post-events. In various embodiments of the present invention, virtual reconstruction tool 112 can compare the precursor event and post-events to identify changes that have occurred to the surrounding area and objects as a result of the events during the physical event.

In various embodiments of the present invention, during comparison between precursor events and post-events, virtual reconstruction tool 112 can perform a comparison between the collected images, video frames, IoT feeds, and/or any other collected data related to the physical event that is known in the art. In various embodiments of the present invention, with image object boundary, and object recognition, virtual reconstruction tool 112 can identify how the relative position and relative state of the objects that were changed as a result of the physical event.

In various embodiments of the present invention, virtual reconstruction tool 112, via video analysis, can analyze a video portion related to the physical event, and identify the type of physical event, type of impact (if necessary), direction of impact (if necessary), duration of impact (if necessary), and amount/number of impacts of the physical event. In various embodiments of the present invention, virtual reconstruction tool 112, via machine learning component 116, can create a knowledge corpus by collecting and storing collected historical information associated with a current physical event and previous physical events. In various embodiments of the present invention, virtual reconstruction tool 112 can create a knowledge corpus by using the gathered data (i.e., previously collected data) to correlate how the relative position of the objects could have be changed because of the physical event. Virtual reconstruction tool 112 can identify multiple types of physical events that can result in the current post-events and the duration of physical event to create such a physical event. In various embodiments of the present invention, the knowledge corpus can assist in virtual reconstructing the physical event. In various embodiments of the present invention, when a user executes virtual reconstruction tool 112 through computing device 110 (e.g., AR glasses) then virtual reconstruction tool 112 connects to the created knowledge corpus and retrieves data related to the physical event to reconstruct the physical event, wherein virtual reconstruction tool 112 uses the knowledge corpus to retrieve data from similar physical events and similar post-events.

In various embodiments of the present invention, virtual reconstruction tool 112 can enable the camera and sensor (not depicted in FIG. 1) executing on computing device 110 to capture the physical event and the area surrounding the physical event area. Additionally, in various embodiments of the present invention, virtual reconstruction tool 112 can enable the camera and sensor executing on computing device 110 to access, capture, and/or retrieve data from an IoT feed. In various embodiments of the present invention, virtual reconstruction tool 112 can recognize one or more objects in a physical event area, wherein virtual reconstruction tool 112 can recognize objects individually, the objects current position and the state of the object (e.g., burnt, broken, intact, etc.). In various embodiments of the present invention, virtual reconstruction tool 112 can predict how the post-events occurred based on the collected and analyzed data.

In various embodiments of the present invention, virtual reconstruction tool 112 can identify possible explanations of the physical event based on the created knowledge corpus. In various embodiments of the present invention, virtual reconstruction tool 112 can send the identified predicting data to computing device 110 (e.g., augmented reality glass), wherein virtual reconstruction tool 112 can create virtual animated objects associated with the current physical event. In various embodiments of the present invention, virtual reconstruction tool 112 can reconstruct the physical event based on the generated predicted events that led up to and occurred during the physical event and can display the virtual reconstruction as an overlay over the physical event area through computing device 110.

Figure 2:
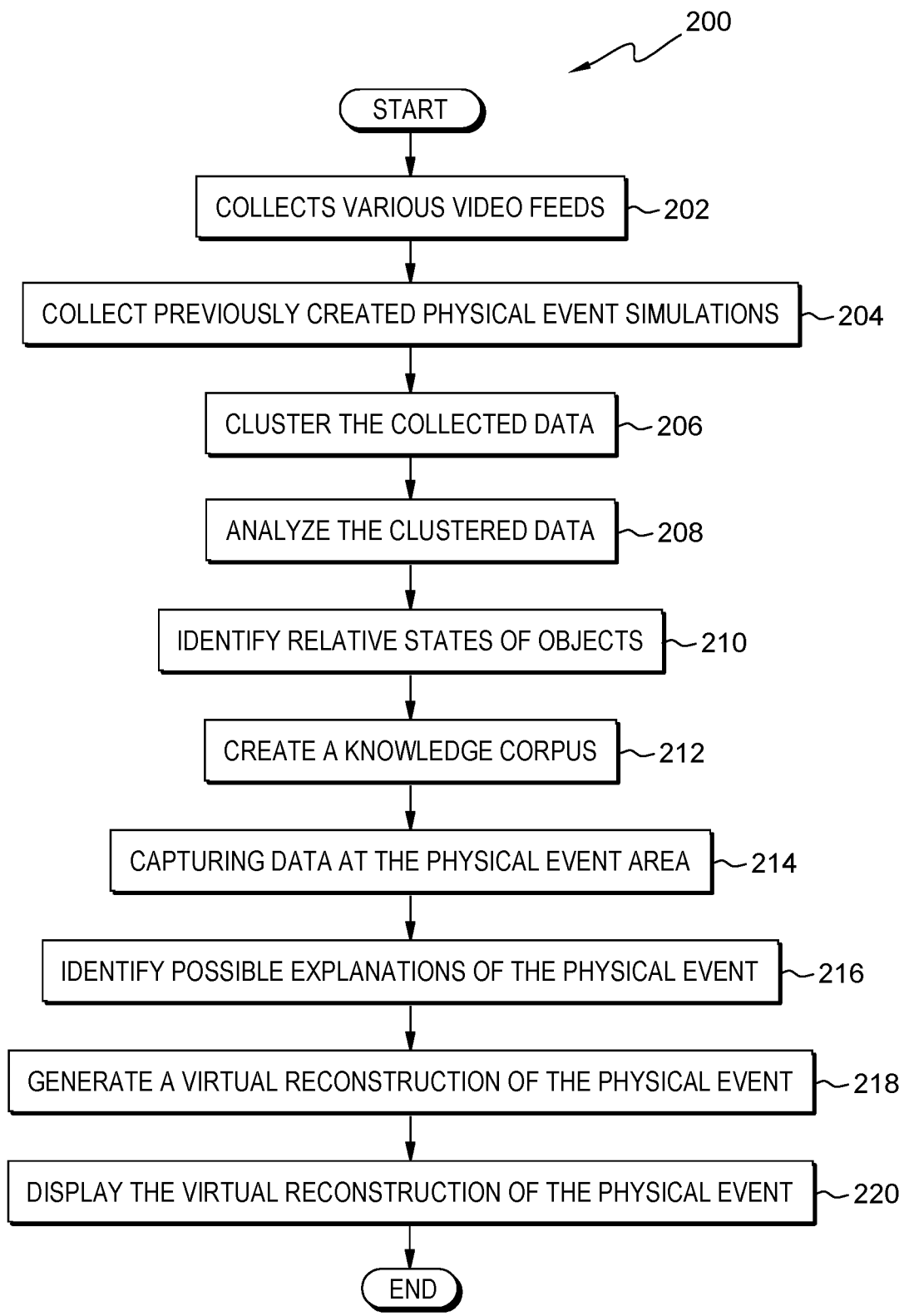
FIG. 2 illustrates operational steps of virtual reconstruction tool, in communication a computing device within the distributed data processing environment of FIG. 1, for predictively reconstructing a physical event using augmented reality, in accordance with an embodiment of the present invention.

FIG. 2 illustrates operational steps of virtual reconstruction tool 112, generally designated 200, in communication with computing device 110, within distributed data processing environment 100 of FIG. 1, for predictively reconstructing a physical event using augmented reality, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, virtual reconstruction tool 112 collects various images or video feeds. In various embodiments, virtual reconstruction tool 112, via data gathering component 114, can collect various images and/or video feeds from various sources (e.g., camera component 108, IoT devices, and/or IoT sensors). In various embodiments of the present invention, virtual reconstruction tool 112, via data gathering component 114, can collect the documented reports of the current physical event and previously documented physical events.

In step 204, virtual reconstruction tool 112 collects previously created physical event simulations. In various embodiments of the present invention, virtual reconstruction tool 112, via data gathering component 114, can collect previously created physical event simulations from a database (e.g., local storage 104 and/or shared storage 124).

In step 206, virtual reconstruction tool 112 clusters the collected data. In various embodiments of the present invention virtual reconstruction tool 112, via data gathering component 114, can cluster the collected data (e.g., collect video feeds from various sources, documented reports, and/or previously created physical event simulations) into three categories (e.g., precursor events, the physical event, and post-events).

In step 208, virtual reconstruction tool 112 analyzes the clustered data. In various embodiments of the present invention, virtual reconstruction tool 112, via machine learning component 114, can analyze the clustered data by comparing the precursor events and post-events to identify the changes caused by the physical event. In various embodiments of the present invention, virtual reconstruction tool 112, via machine learning component 114, using image object boundary and object recognition, can identify how the relative position and relative state of an object has changed due to the physical event. For example, after an earthquake the relative position of the objects in the store will have changed or have become damaged (plates falling off the shelves and shattering on the floor).

In step 210, virtual reconstruction tool 112 identifies the relative states of objects involved in the physical event. In various embodiments of the present invention, virtual reconstruction tool 112, via machine learning component 114, can use video analysis to analyze the collected video feeds and identify portions of the collected video feeds that are relevant to the physical event. In various embodiments of the present invention, virtual reconstruction tool 112, via machine learning component 114, can use video analysis to identify the type of physical event, type of impact that occurred before, after, or during the physical event, the direction of impact, the duration of impact, and number of impacts involved in the current physical event.

In step 212, virtual reconstruction tool 112 creates a knowledge corpus. In various embodiments of the present invention, virtual reconstruction tool 112, via machine learning component 114, can create a knowledge corpus by collecting and storing collected historical information associated with a current physical event and previous physical events. In various embodiments of the present invention, virtual reconstruction tool 112, via machine learning component 114, can create a knowledge corpus by using the collected historical information associated with a current physical event and previous physical events to correlate how the relative position of the objects in the physical event area has changed due to the physical event, the types of physical events associated with the post-events, and the duration of physical event that resulted in the post-events. In various embodiments of the present invention, virtual reconstruction tool 112 can use the knowledge corpus to help reconstruct the physical event by using clustered data and identified relevant video portions to construct simulated physical event scenarios.

In step 214, virtual reconstruction tool 112 captures data at the physical event area. In various embodiments of the present invention, virtual reconstruction tool 112, via data gathering component 114, can capture and collect data from the physical event area, while the user observes the physical event and physical event area with computing device 110. The camera and sensor installed on the AR glasses can capture the video and/or photos of the physical event area and create an IoT feed. The captured video and/or photos of the physical event area and the created IoT feed can be analyzed by virtual reconstruction tool 112 for data points that can help predict the events that's that caused the physical event (i.e., precursor events). In various embodiments of the present invention, virtual reconstruction tool 112 can recognize each and every object individually, the current position of an object, and the state of an object (e.g., burnt, broken, intact, dented, scratched, and/or any other condition or state of any object known in the art) involved or associated with the physical event. For example, a user is wearing AR glasses and is walking around a car accident observing the scene and taking notes for a written report. In this example, as the user is collecting information for the written report virtual reconstruction tool 112 is passively collecting video and capturing photos of the cars involved in the car accident, the damage to those cars, the angle of the cars, and the position of the cars.

In step 216, virtual reconstruction tool 112 identifies possible explanations of events that took place during the physical event. In various embodiments of the present invention, virtual reconstruction tool 112, machine learning component 116, can identify possible precursor events based on the collected data and knowledge corpus. In various embodiments of the present invention, virtual reconstruction tool 112, can identify possible reasons or explanations as to how the physical event occurred.

In step 218, virtual reconstruction tool 112 generates a virtual reconstruction of the physical event. In various embodiments of the present invention, virtual reconstruction tool 112, via augmented reality component 118, can generate a virtual reconstruction of the physical event, wherein the physical reconstruction of the physical event is an AR simulation. In various embodiments of the present invention, virtual reconstruction tool 112 generates a virtual reconstruction of the physical event based on the identified possible precursor events.

In step 220, virtual reconstruction tool 112 displays the virtual reconstruction of the physical event. In various embodiments of the present invention, virtual reconstruction tool 112, via augmented reality component 118, can display the generated virtual reconstruction of the physical event on computing device 110 (e.g., smartphone or AR glasses). In various embodiments of the present invention, the displayed virtual reconstruction of the physical event can be laid over the actual physical event and/or physical event area.

Figure 3:
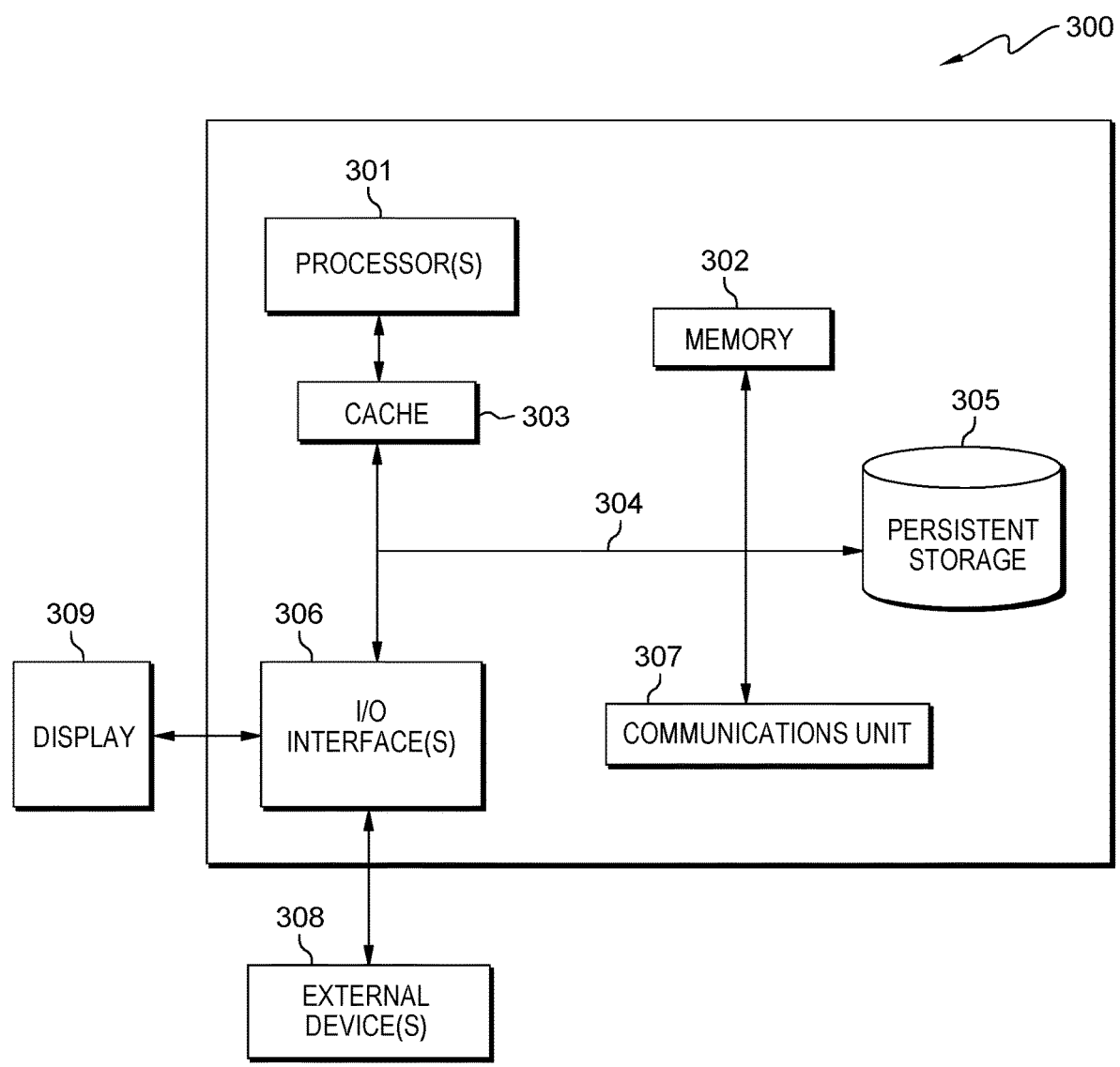
FIG. 3 depicts a block diagram of components of a computing device executing the virtual reconstruction tool within the distributed data processing environment of FIG. 1, in accordance with an embodiment of the present invention.

FIG. 3 depicts a block diagram of components of computing device 110 executing virtual reconstruction tool 112 within distributed data processing environment 100 of FIG. 1, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

FIG. 3 depicts computer system 300, where computing device 110 represents an example of computer system 300 that includes virtual reconstruction tool 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for predictively reconstructing a physical event using augmented reality, the computer-implemented method comprising:
   identifying relative states of objects located in a physical event area by using video analysis to analyze collected video feeds from the physical event area before and after a physical event involving at least one of the objects;
   creating a knowledge corpus including the video analysis and the collected video feeds associated with the physical event and historical information from previous physical events to correlate how relative positions of objects in the physical event area changed due to the physical event, types of physical events associated with post-events, and duration of the physical event that resulted in the post-events;
   capturing data, by a computing device, of the physical event area;
   identifying possible precursor events based on the captured data and the knowledge corpus;
   generating a virtual reconstruction of the physical event using the possible precursor events, wherein the physical reconstruction of the physical event is a predicted physical event most likely to have occurred during the physical event;
   displaying, by the computing device, the generated virtual reconstruction of the predicted physical event, wherein the displayed virtual reconstruction of the predicted physical event overlays an image of the physical event area; and
   editing a collaborative explanation in parallel with the generated virtual reconstruction, wherein editing comprises:
   branching from a primary explanation; and
   running a plurality of simulations on the branch from the primary explanation.

2. The computer-implemented method of claim 1 wherein:
   sunlight is a first object and a position of sun in the sky is a first relative state with respect to a traffic intersection and nearby buildings;
   a possible precursor event is the sunlight shining into a driver's eyes while at the intersection; and
   the virtual reconstruction includes a view of the sun as seen by the driver's eyes.

3. The computer-implemented method of claim 2, further comprising:
   displaying to a user the view of the sun as seen by the driver's eyes.

4. The computer-implemented method of claim 3, wherein the view of the sun is through a rear-view mirror of a car driven by the user.

5. The computer-implemented method of claim 1, wherein displaying the generated virtual reconstruction of the physical event further comprises:
   mimicking lighting, weather conditions, and environment conditions of the physical event area at the time the physical event occurred;
   predicting an original position of various objects involved in the physical event before the physical event occurred;
virtually displaying how the relative position of the objects were changed due to the physical event; and
   collecting historical information from various sources of information such as: previously recorded video feed of different types of physical events, IoT feeds related to any physical event, previously generated computer graphics simulation results of different types of physical events, physical event reports, live video feed of the current physical event area.

6. The computer-implemented method of claim 1 further comprising:
   comparing the generated virtual reconstruction of the physical event to various regulations and constraints derived from a database, wherein the various regulations and constraints derived from the database comprise: building codes, traffic laws, safety certifications, engineering specifications, and product warranties;
   highlighting objects, sequences, and cause effect relationships in the generated virtual reconstruction of the physical event; and
annotating the objects, the sequences, and the cause effect relationships with color or symbols to indicate a departure from constraints, codes, certifications, specifications, and warranties that have occurred in the physical event area.

7. The computer-implemented method of claim 1 further comprising:
   presenting a list of potential scenarios of precursor events to a user, wherein the list of potential scenarios of precursor events is presented to the user through the computing device; and
   displaying different scenarios to the user that depict how the physical event might have occurred, which includes the type of physical event and demonstrates how the positions of the objects have moved or have been damaged.

8. A computer program product for virtual object placement in augmented reality environments, the computer program product comprising:
   one or more computer readable storage medium and program instructions stored on the one or more computer readable storage medium, the stored program instructions comprising:
      program instructions to identify relative states of objects located in a physical event area by using video analysis to analyze collected video feeds from the physical event area before and after a physical event involving at least one of the objects;
      program instructions to create a knowledge corpus including the video analysis and the collected video feeds associated with the physical event and historical information from previous physical events to correlate how relative positions of objects in the physical event area changed due to the physical event, types of physical events associated with post-events, and duration of the physical event that resulted in the post-events;
      program instructions to capture data, by a computing device, of the physical event area;
      program instructions to identify possible precursor events based on the captured data and the knowledge corpus;
      program instructions to generate a virtual reconstruction of the physical event using the possible precursor events, wherein the physical reconstruction of the physical event is a predicted physical event most likely to have occurred during the physical event;
      program instructions to display, by the computing device, the generated virtual reconstruction of the predicted physical event, wherein the displayed virtual reconstruction of the predicted physical event overlays an image of the physical event area; and
      program instructions edit a collaborative explanation in parallel with the generated virtual reconstruction, wherein editing comprises:
         program instructions branch from a primary explanation; and
         program instructions run a plurality of simulations on the branch from the primary explanation.

9. The computer program product of claim 8 wherein:
sunlight is a first object and a position of sun in the sky is a first relative state with respect to a traffic intersection and nearby buildings;
a possible precursor event is the sunlight shining into a driver's eyes while at the intersection; and
the virtual reconstruction includes a view of the sun as seen by the driver's eyes.

10. The computer program product of claim 9, further comprising:
   program instructions to display to a user the view of the sun as seen by the driver's eyes.

11. The computer program product of claim 10, wherein the view of the sun is through a rear-view mirror of a car driven by the user.

12. The computer program product of claim 8, wherein displaying the generated virtual reconstruction of the physical event further comprises:
   program instructions to mimic lighting, weather conditions, and environment conditions of the physical event area at the time the physical event occurred;
   program instructions to predict an original position of various objects involved in the physical event before the physical event occurred;
program instructions to virtually display how the relative position of the objects were changed due to the physical event; and
   program instructions to collect historical information from various sources of information such as: previously recorded video feed of different types of physical events, IoT feeds related to any physical event, previously generated computer graphics simulation results of different types of physical events, physical event reports, live video feed of the current physical event area.

13. The computer program product of claim 8 further comprising:
   program instructions to compare the generated virtual reconstruction of the physical event to various regulations and constraints derived from a database, wherein the various regulations and constraints derived from the database comprise: building codes, traffic laws, safety certifications, engineering specifications, and product warranties;
program instructions to highlight objects, sequences, and cause effect relationships in the generated virtual reconstruction of the physical event; and
program instructions to annotate the objects, the sequences, and the cause effect relationships with color or symbols to indicate a departure from the constraints, codes, certifications, specifications, and warranties that have occurred in the physical event area.

14. The computer program product of claim 8 further comprising:
program instructions to present a list of potential scenarios of precursor events to a user, wherein the list of potential scenarios of precursor events is presented to the user through the computing device; and
program instructions to display different scenarios to the user that depict how the physical event might have occurred, which includes the type of physical event and demonstrates how the positions of the objects have moved or have been damaged.

15. A computer system for virtual object placement in augmented reality environments, the computer system comprising:
one or more computer processors;
one or more computer readable storage devices;
program instructions stored on the one or more computer readable storage devices for execution by at least one of the one or more computer processors, the stored program instructions comprising:
program instructions to identify relative states of objects located in a physical event area by using video analysis to analyze collected video feeds from the physical event area before and after a physical event involving at least one of the objects;
program instructions to create a knowledge corpus including the video analysis and the collected video feeds associated with the physical event and historical information from previous physical events to correlate how relative positions of objects in the physical event area changed due to the physical event, types of physical events associated with post-events, and duration of the physical event that resulted in the post-events;
program instructions to capture data, by a computing device, of the physical event area;
program instructions to identify possible precursor events based on the captured data and the knowledge corpus;
program instructions to generate a virtual reconstruction of the physical event using the possible precursor events, wherein the physical reconstruction of the physical event is a predicted physical event most likely to have occurred during the physical event;
program instructions to display, by the computing device, the generated virtual reconstruction of the predicted physical event, wherein the displayed virtual reconstruction of the predicted physical event overlays an image of the physical event area; and
program instructions edit a collaborative explanation in parallel with the generated virtual reconstruction, wherein editing comprises:
program instructions branch from a primary explanation; and
program instructions run a plurality of simulations on the branch from the primary explanation.

16. The computer system of claim 15 wherein:
sunlight is a first object and a position of sun in the sky is a first relative state with respect to a traffic intersection and nearby buildings;
a possible precursor event is the sunlight shining into a driver's eyes while at the intersection; and
the virtual reconstruction includes a view of the sun as seen by the driver's eyes.

17. The computer system of claim 16, further comprising:
program instructions to display to a user the view of the sun as seen by the driver's eyes, wherein the view of the sun is through a rear-view mirror of a car driven by the user.

18. The computer system of claim 15, wherein displaying the generated virtual reconstruction of the physical event further comprises:
program instructions to mimic lighting, weather conditions, and environment conditions of the physical event area at the time the physical event occurred;
program instructions to predict an original position of various objects involved in the physical event before the physical event occurred;
program instructions to virtually display how the relative position of the objects were changed due to the physical event; and
program instructions to collect historical information from various sources of information such as: previously recorded video feed of different types of physical events, IoT feeds related to any physical event, previously generated computer graphics simulation results of different types of physical events, physical event reports, live video feed of the current physical event area.

19. The computer system of claim 15 further comprising:
program instructions to compare the generated virtual reconstruction of the physical event to various regulations and constraints derived from a database, wherein the various regulations and constraints derived from the database comprise: building codes, traffic laws, safety certifications, engineering specifications, and product warranties;
program instructions to highlight objects, sequences, and cause effect relationships in the generated virtual reconstruction of the physical event; and
program instructions to annotate the objects, the sequences, and the cause effect relationships with color or symbols to indicate a departure from constraints, codes, certifications, specifications, and warranties that have occurred in the physical event area.

20. The computer system of claim 15 further comprising:
program instructions to present a list of potential scenarios of precursor events to a user, wherein the list of potential scenarios of precursor events is presented to the user through the computing device; and
program instructions to display different scenarios to the user that depict how the physical event might have occurred, which includes the type of physical event and demonstrates how the positions of the objects have moved or have been damaged.

* * * * *